US006951594B2

(12) United States Patent
Tweel et al.

(10) Patent No.: US 6,951,594 B2
(45) Date of Patent: Oct. 4, 2005

(54) PRINTED OVEN MITT AND METHOD FOR MAKING SAME

(75) Inventors: Donald E. Tweel, Closter, NJ (US); Joseph R. Missry, Long Branch, NJ (US)

(73) Assignee: Tweel Home Furnishings, Inc., Newark, NJ (US)

( * ) Notice: Subject to any disclaimer, the term of this patent is extended or adjusted under 35 U.S.C. 154(b) by 64 days.

(21) Appl. No.: 10/388,009

(22) Filed: Mar. 13, 2003

(65) Prior Publication Data

US 2004/0000373 A1 Jan. 1, 2004

Related U.S. Application Data

(60) Provisional application No. 60/392,702, filed on Jun. 27, 2002.

(51) Int. Cl.$^7$ .............................. B44C 1/17; B32B 31/20; A47J 45/10; A41D 13/08
(52) U.S. Cl. ....................... 156/230; 156/235; 156/240; 156/273.3; 156/277; 428/201; 428/914; 8/468; 8/471; 16/431; 16/435; 2/16; 2/20
(58) Field of Search ................................. 156/230, 234, 156/235, 240, 241, 247, 277, 289, 272.2, 273.3, 273.5; 427/146, 147, 148, 299; 428/40.1, 42.1, 42.3, 195.1, 200, 201, 202, 914; 430/126, 199; 8/468, 471; 16/435, 431; 2/16, 20

(56) References Cited

U.S. PATENT DOCUMENTS

| | | | | |
|---|---|---|---|---|
| 580,148 A | * | 4/1897 | Staples | 38/95 |
| 2,261,064 A | * | 10/1941 | Katz | 2/20 |
| 4,021,591 A | | 5/1977 | DeVries et al. | 428/200 |
| 4,411,667 A | | 10/1983 | Meredith et al. | 8/471 |
| 4,576,610 A | | 3/1986 | Donenfeld | 8/471 |
| 4,892,501 A | | 1/1990 | Girelli | 446/372 |
| 4,930,814 A | | 6/1990 | Nusmeier | 283/109 |
| 5,135,905 A | | 8/1992 | Egashira et al. | 503/227 |
| 5,250,494 A | | 10/1993 | Wehrmann et al. | 503/227 |
| 5,389,493 A | | 2/1995 | Asai et al. | 430/211 |
| 5,486,500 A | | 1/1996 | Kaufman | 503/227 |
| 5,528,773 A | | 6/1996 | Lowinger | 2/161.4 |
| 5,575,877 A | * | 11/1996 | Hale et al. | 156/240 |
| 5,706,733 A | | 1/1998 | Bichler | 101/487 |
| 5,863,641 A | | 1/1999 | Sakamoto et al. | 428/216 |
| 5,933,867 A | | 8/1999 | Corder | 2/160 |
| 5,962,368 A | | 10/1999 | Poole | 503/227 |
| 5,980,588 A | | 11/1999 | Valmassoi | 8/467 |
| 6,035,777 A | | 3/2000 | King | 101/34 |
| 6,044,494 A | | 4/2000 | Kang | 2/167 |
| 6,112,372 A | * | 9/2000 | Zhou et al. | 16/435 |
| 6,126,699 A | | 10/2000 | McCurley | 8/471 |
| 6,249,297 B1 | | 6/2001 | Lion | 347/171 |
| 6,264,782 B1 | | 7/2001 | Oshima et al. | 156/237 |
| 6,346,315 B1 | | 2/2002 | Sawatsky | 428/201 |
| 6,391,441 B1 | | 5/2002 | Yano et al. | 428/343 |
| 6,409,330 B1 | | 6/2002 | Nakamura et al. | 347/103 |
| 6,423,169 B1 | | 7/2002 | Cobb | 156/230 |
| D470,980 S | | 2/2003 | Bignon et al. | D29/118 |
| 6,532,597 B2 | | 3/2003 | Bignon et al. | 2/161.6 |
| D473,346 S | | 4/2003 | Barrett | D29/123 |
| 2002/0174478 A1 | | 11/2002 | Litke | 2/161.4 |

FOREIGN PATENT DOCUMENTS

| | | | | |
|---|---|---|---|---|
| EP | 0 712 590 A2 | | 5/1996 | |
| JP | 51/147 127 | | 6/1993 | |
| JP | 61/173 104 | | 6/1994 | |
| JP | 10-257986 | * | 9/1998 | A47J/45/10 |
| JP | 10-328050 | * | 12/1998 | A47J/45/10 |
| WO | WO 93/11677 | | 6/1993 | |
| ZA | 9509159 | * | 8/1996 | B41M/00/00 |

* cited by examiner

*Primary Examiner*—J. A. Lorengo
(74) *Attorney, Agent, or Firm*—Woodcock Washburn LLP

(57) ABSTRACT

Printed placemats, potholders, and oven mitts, and process for producing same using a high definition color sublimation printing technique. The sublimation printing technique applies a high quality image onto a print receiving layer that is incorporated into a printed placemat, potholder, or oven mitt. The print receiving layer can be adhesively bonded to the printed placemat, potholder, or oven mitt.

20 Claims, 5 Drawing Sheets

PRINTED OVEN MITT AND METHOD FOR MAKING SAME

This application claims the benefit of U.S. Provisional Application No. 60/392,702, filed Jun. 27, 2002.

FIELD OF THE INVENTION

The present invention relates generally to a printed textile and method for making same, and more particularly to a printed placemat, potholder, or oven mitt and process where the printed image is obtained by heat transfer sublimation printing techniques.

BACKGROUND OF THE INVENTION

High quality decorative kitchen textiles such as placemats, potholders oven mitts, tablecloths, and napkins are always in demand and highly sought after for home and commercial applications. The reproduction of sharp and durable images with extraordinary image resolution and retention on such textile products remains a constant problem and unmet need in the textile producing industry.

The current methods used to produce printed placemats is silk screening. Silk screening produces a relatively poor image with low color and image retention after final assembly using pre-printed fabrics. Further, the image produced by silk screening is not durable and fades when washed. Accordingly, it is highly desirable to have a printed placemat, potholder, or oven mitt with durable and sharp image that is efficient and economical to produce. Until the present invention, it was not known to use a sublimation transfer process for placemats, potholder, or oven mitts. The placemat, potholder, or oven mitt of the present invention have sharp images that can withstand repeated washings without fading.

SUMMARY OF THE INVENTION

The present invention is a printed placemat, potholder and oven mitt, and process for producing same using a high definition color sublimation printing technique. The sublimation printing technique applies a high quality image onto a print receiving layer that is incorporated into a printed placemat, potholder, or oven mitt. The use of sublimation printing allows for better color absorption while not limiting the amount of colors that can be used as in traditional screen printing. The print receiving layer can be adhesively bonded to the printed placemat, potholder, or oven mitt or attached with stitching.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF ILLUSTRATIVE EMBODIMENTS

The present inventions provide printed placemats, potholders, and oven mitts constructed in a manner that allows them to be printed using a high definition color sublimation printing technique. The printed placemats, potholders, and oven mitts have a print receiving layer attached to the article by mechanical or chemical means, such as but not limited to, stitching and/or an adhesive layer.

A blank print receiving layer is treated with heat and pressure sufficient to fix (also referred to as preshrink) the material. Although it is preferred that the material be preshrunk prior to, or at the time of, final fabrication, it is understood that it can also be preshrunk before, during or after final fabrication. To achieve high resolution from the image transfer process and to achieve uniformity in shape of the final product, heat and pressure are applied to the print receiving layer prior to or at the time of the image transfer process. Printing on the print receiving layer is applied using a sublimation printing process employing image transfer from a dye sheet by means of heat and pressure.

Figure 1:
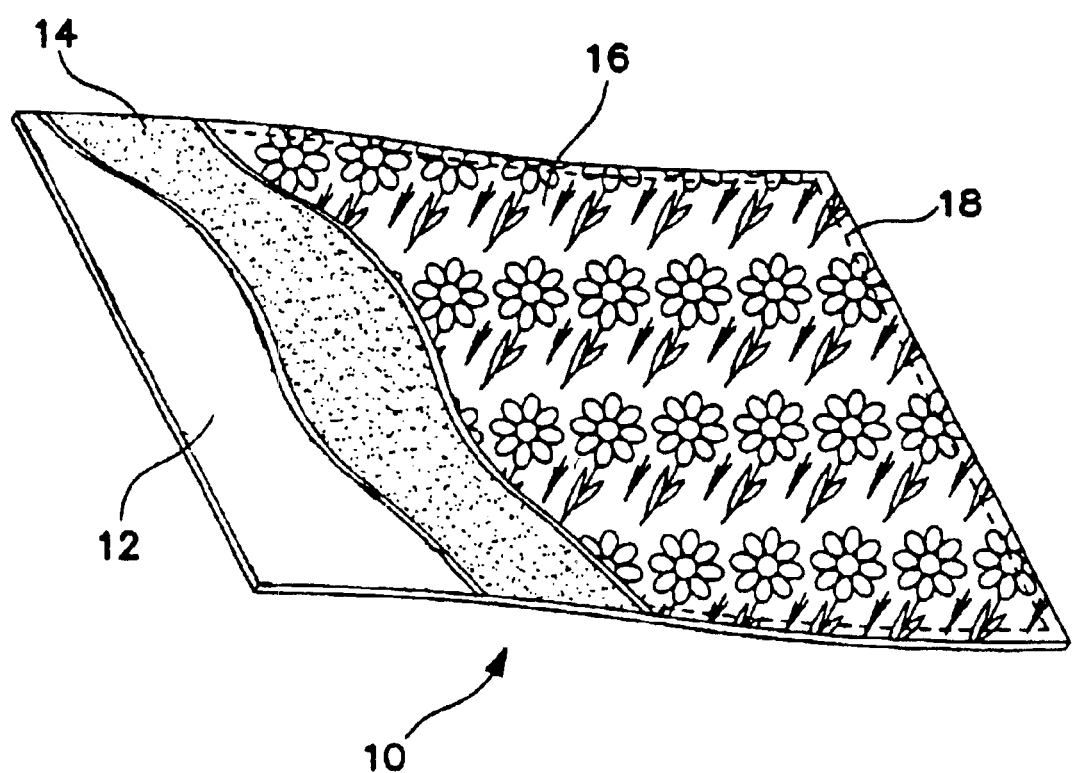
FIG. 1 is a perspective view with cut-away that illustrates a placemat according to one embodiment of the invention.

FIG. 1 shows an exemplary printed placemat 10 with a cut away to illustrate the placemat's construction. As shown in FIG. 1, the placemat 10 is composed of two pieces of fabric. The first fabric is the print receiving piece or layer 16. The print receiving layer 16 is preferably composed of a single-ply non-absorbent material selected from the group consisting of polyester, nylon, and acrylic, or some combination thereof. In certain embodiments, the print receiving layer 16 is composed of 100% polyester. It is understood, however, that fabrics containing less than 100% polyester may also be used.

The second piece of fabric is the body or backing layer 12 of the placemat 10 and is preferably composed of a polyester and cotton blend. In certain preferred embodiments, a 50% polyester/50% cotton blend is used to form the backing layer 12. It is understood, however, that fabrics containing some other blend of natural and synthetic fibers can also be used. Further, the material used for the backing layer 12 can comprise 100% natural or synthetic fibers.

The print receiving layer 16 and backing layer 12 can be treated with a combination of resins to form an adhesive layer 14 that is used to assemble and secure the print receiving layer 16 and backing layer 12 to each other. An adhesive layer 14 that covers the majority of the top face of the backing layer 12 and the lower bottom face of the print receiving layer 16 can be used to improve the stiffness and shape retention of the printed placemat 10. As such, the printed placement 10 will lie flat and not wrinkle.

In certain embodiments, two types of resins are used in combination, one is a low temperature resin to secure the two fabrics into a working assembly, and the second is a high temperature resin to permanently secure the fabrics when the image is transferred to the print receiving layer 16. The composition of resins is between 10 to 40% low temperature resin and 60 to 90% high temperature resin. The ratio of low temperature resin to high temperature resin can be varied depending on the amount of retention desired in the initial heating stage.

In certain embodiments, the low temperature resin is a copolyester adhesive made by EMS-CHEMIE Inc. known as Griltex® 9 and the higher temperature resin is a copolyester adhesive made by EMS-CHEMIE Inc. known as Griltex® D 1377E. The resins can be applied by means of a roll glue coating machine, such as that made by 2M in Quebec Canada. Other application machines, known to those skilled in the art, can also be used to apply the resins. Alternatively, the resins can be applied to the fabrics in powder form by dusting or by spray or soaking in liquid form.

After the resins are applied, the print receiving layer 16 and backing layer 12 are cut to size and placed adjacent to one another. In certain embodiments, a stitching 18 is used to help maintain proper alignment and bonding between the print receiving layer 16 and backing layer 12. An initial amount of heat and pressure is applied to the placemat 10 to form a bond between the print receiving layer 16 and backing layer 12. A transfer dye containing a desired image is placed onto the print receiving layer 16 and the image is transferred to the placemat using sublimation printing techniques. A final amount of heat and pressure is applied to the placemat 10 to transfer the image of a transfer dye onto the print receiving layer 16. In addition to transferring the image to the print receiving layer 16, the application of heat and pressure makes the adhesion between the print receiving layer 16 and backing layer 12 more permanent.

In one embodiment, the print receiving layer 16 and backing layer 12 are placed through a roll glue coating machine where the resins are applied to the fabrics. The print receiving layer 16 and backing layer 12 are placed together and passed through an initial heat and pressure process of 375–425 degrees F., for 10–20 seconds, at 60–80 PSI. A transfer dye containing a desired image is placed onto the print receiving layer 16 and the image is transferred to the placemat using sublimation printing techniques.

In another embodiment, the perimeter edges of the print receiving layer 16 and backing layer 12 are folded over after the resins are applied. Folding over the edges of the print receiving layer 16 and backing layer 12 prevents the resin from being exposed at the edge of the placemat 10 and creates a more appealing edge. The resin is used to keep the edges folded. The print receiving layer 16 and backing layer 12 are placed together. Stitching 18 is used around the perimeter to combine the print receiving layer 16 and backing layer 12 where the resin is covered by the fold. The placemat 10 is passed through an initial heat and pressure process of 375–425 degrees F., for 10–20 seconds, at 60–80 PSI. A transfer dye containing a desired image is placed onto the print receiving layer 16 and the image is transferred to the placemat using sublimation printing techniques. The image covers the stitching 18 and makes the stitching 18 inconspicuous.

In another embodiment, the perimeter edges of the print receiving layer 16 and backing layer 12 cut and not folded. The resins can be applied before or after cutting. Heat may accompany the cutting process such that the cut edges are crimped to prevent unraveling.

Figure 2:
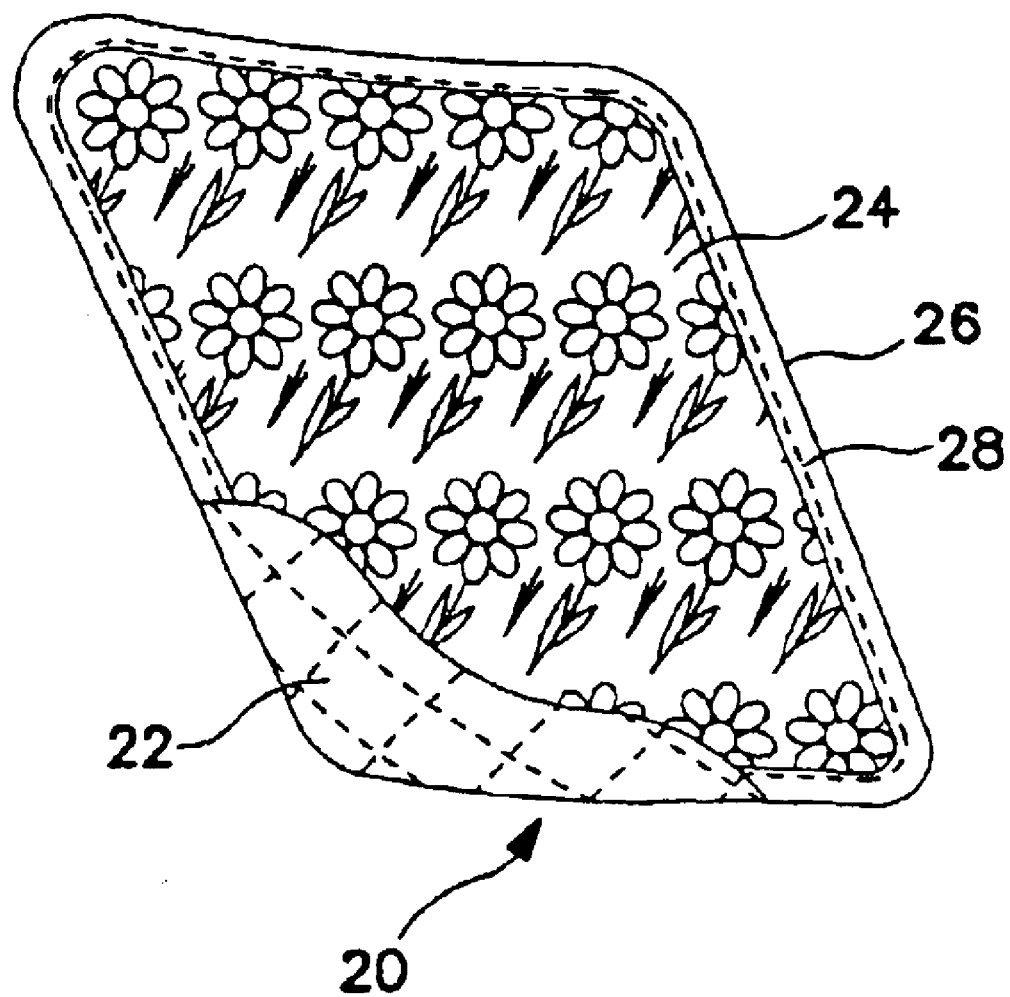
FIG. 2 is a perspective view with cut-away that illustrates a potholder according to one embodiment of the invention.

FIG. 2 shows an exemplary printed potholder 20 with a cut away to illustrate the potholder's construction. As shown in FIG. 2, the printed potholder 20 has a backing layer 22 and a print receiving layer 24. The print receiving layer 24 is preferably composed of a single-ply non-absorbent material selected from the group consisting of polyester, nylon, acrylic, or some combination thereof. In certain embodiments, the print receiving layer 16 is composed of 100% polyester. It is understood, however, that fabrics containing less than 100% polyester may also be used.

The second piece of fabric is the body or backing layer 22 of the printed potholder 20 and is preferably composed of a polyester and cotton blend. In preferred embodiments, the backing layer 22 is a quilted heat resistant fabric. In certain embodiments, a 50% polyester/50% cotton blend is used to form the backing layer 22. It is understood, however, that fabrics containing 100% natural, 100% synthetic, or some other blend of natural and synthetic fibers can also be used. Further, the backing layer 22 may comprise several layers of material, including a woven decorative outer layer and a three-dimensional non-woven inner layer.

The potholder 20 can be assembled using an adhesive layer in a similar fashion to that described for the printed placement 10. Alternatively, the print receiving layer 24 can be attached to the backing layer 22 with stitching 28. Binding 26 can be used along with the stitching 28 to cover unfinished edges and improve the potholder's appearance. In preferred embodiments, the print receiving layer 24 is printed prior to assembling the potholder 20 and is attached to the potholder 20 with stitching 28.

In one embodiment, a printed potholder is produced that has a print receiving layer 24 made from a single-ply polyester fabric sheet. The print receiving layer 24 is cut and pre-shrunk by the application of a heat process of 375–425 degrees for 10–20 seconds at 60–80 psi. An image is then applied to the print receiving layer 24 by sublimation printing. The printed receiving layer 24 is cut to be congruent and conform with the shape of the backing layer 22. The backing layer 22 is comprised of a layer of heat resistant woven fabric on the face opposite the print receiving layer 24 and a layer of quilted heat resistant non-woven materials between the woven fabric and print receiving layer 24. The print receiving layer 24 and backing layer 22 are joined and binding 26 is placed around the perimeter. Stitching 28 is then applied to the potholder 20 proximate the binding 26 to join the binding 26, print receiving layer 24, and backing layer 22.

Figure 3:
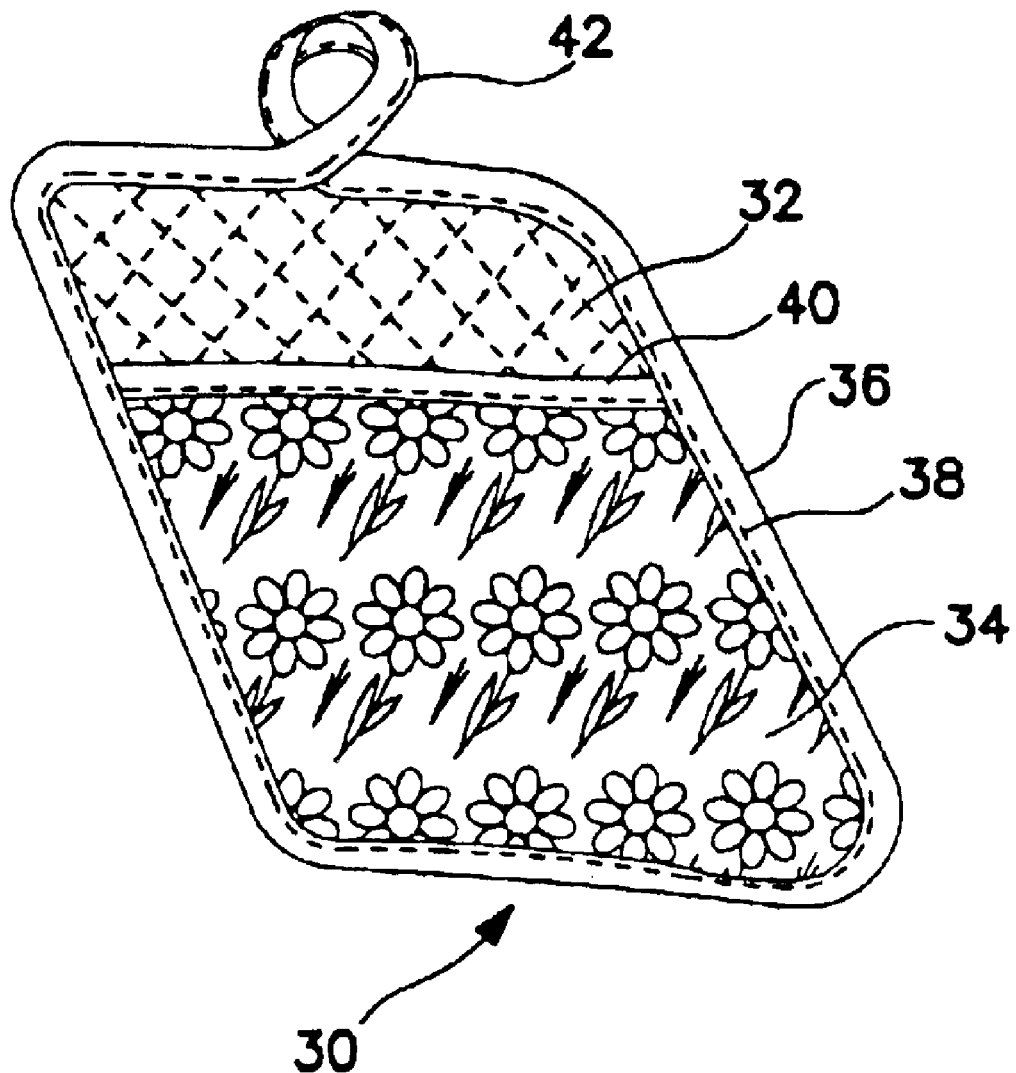
FIG. 3 is a perspective view that illustrates a pocket potholder according to one embodiment of the invention.

FIG. 3 shows a printed potholder with pocket 30. As shown in FIG. 3, the print receiving layer 34 does not cover the backing layer 22 completely. The printed potholder with pocket 30 is assembled in a similar manner to that described for printed potholder 20, shown and described as FIG. 2, except that pocket binding 40 is used to form an entrance to a pocket between the print receiving layer 34 and the backing layer 22. As such, a user may place his or her hand between the print receiving layer 34 and backing layer 22 to assist in handling the potholder. Also shown in FIG. 3, is a loop 42 created from binding 36 and stitching 38 for hanging the printed potholder with pocket 30 when not in use.

Figure 4:
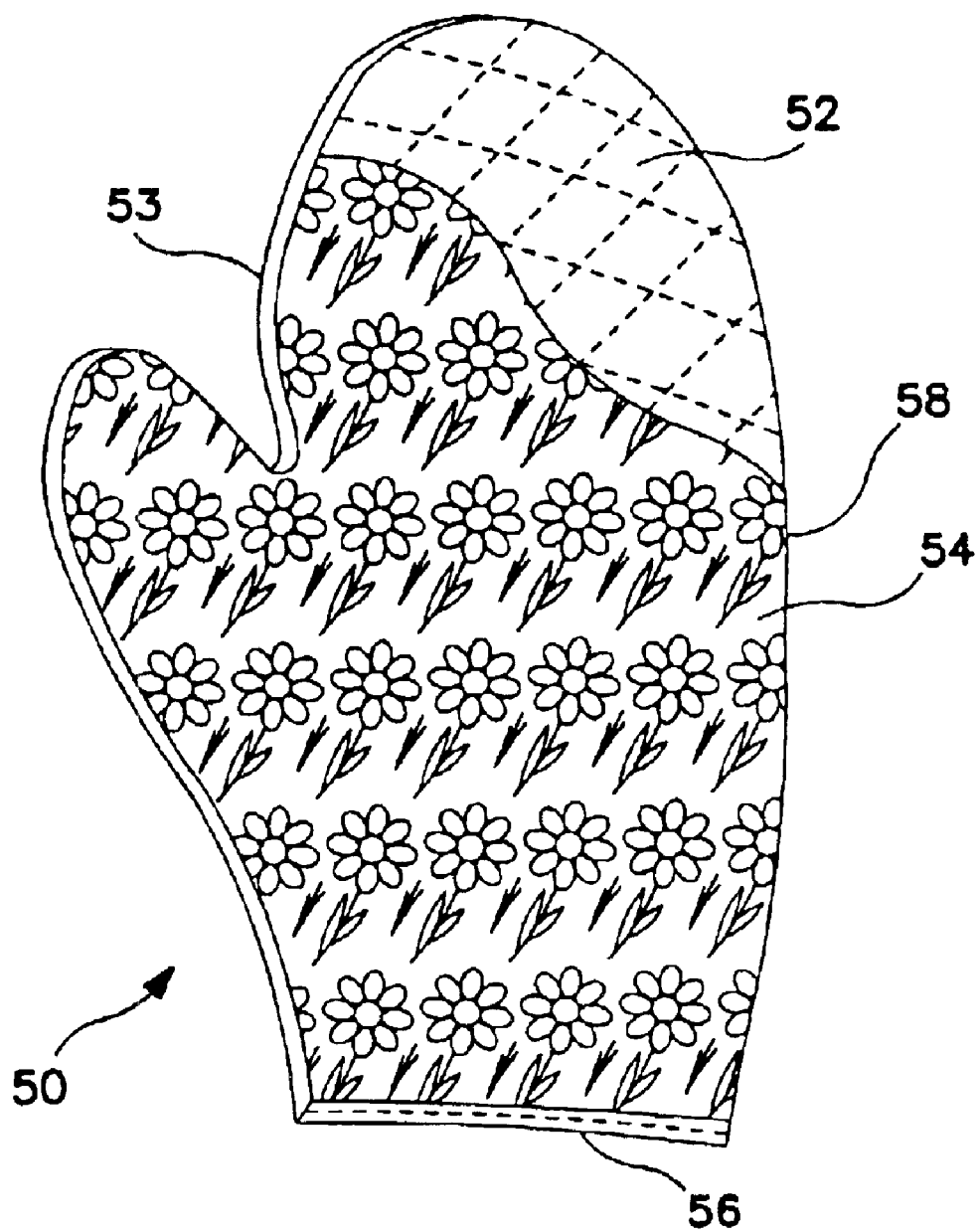
FIG. 4 illustrates a full print oven mitt according to one embodiment of the invention.

FIG. 4 shows a full print oven mitt 50. As shown in FIG. 4, the oven mitt is assembled in a similar manner to printed potholder 20. The oven mitt 50 has a print receiving layer 54 and a backing layer 52. Unlike the potholder 20, the oven mitt 50 has a third layer 53 opposite the backing layer 52 to form a mitt. The mitt forming or third layer 53 can be made from the same materials used for the backing layer 52.

In one embodiment, an oven mitt is produced that has a print receiving layer 54 made from a single-ply polyester fabric sheet. The print receiving layer 54 is cut and pre-shrunk by the application of a heat process of 375–425 degrees for 10–20 seconds at 60–80 psi. An image is then applied to the print receiving layer 54 by sublimation printing. A backing layer 52 and a third layer 53 are cut from a heat resistant material. The heat resistant material can be a batting between non-woven materials. The backing layer 52 and third layer 53 form mirror images of each other. The printed receiving layer 54 is cut to be congruent and conform with the shape of the backing layer 52. The print receiving layer 54, backing layer 52, and third layer 53 are joined around the perimeter by stitching 58. Binding 56 is attached at the oven mitt 50 opening.

Figure 5:
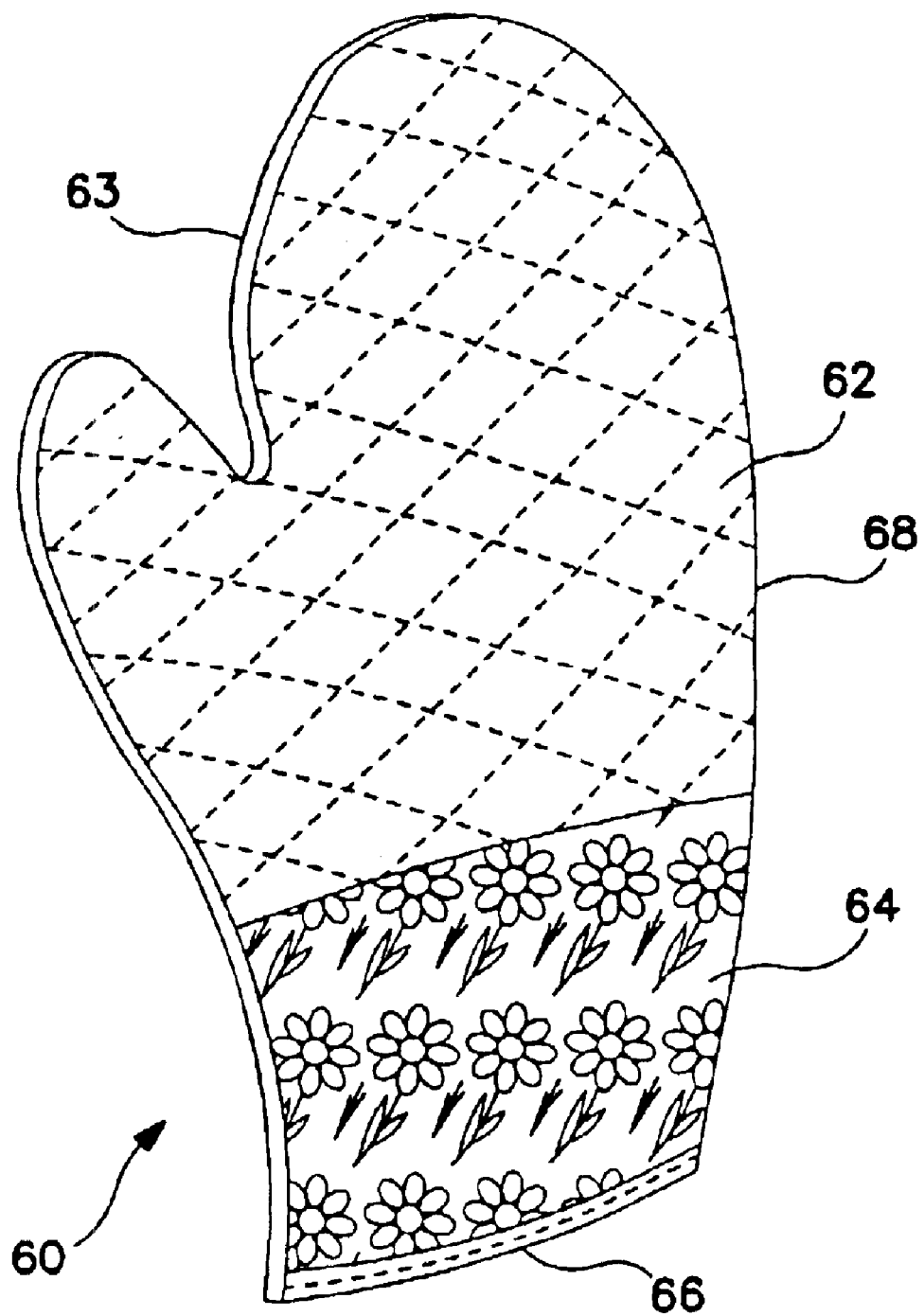
FIG. 5 is a perspective view that illustrates a cuff print oven mitt according to one embodiment of the invention.

FIG. 5 shows a cuff print oven mitt 60. As shown in FIG. 5, the oven mitt is assembled in a similar manner to the full print oven mitt 50. The oven mitt 60 has a print receiving layer 64, a backing layer 62, a third layer 63, binding 66, and a seam 68. Unlike the full print oven mitt 50, however, the print receiving layer 64 of the cuff print oven mitt 60 only covers a portion of the backing layer 62.

These and other advantages of the present invention will be apparent to those skilled in the art from the foregoing specification. Accordingly, it will be recognized by those skilled in the art that changes or modifications may be made to the above-described embodiments without departing from the broad inventive concepts of the inventions. It should therefore be understood that the inventions are not limited to the particular embodiments described herein, but are intended to include all changes and modifications that are within the scope and spirit of the inventions as set forth in the claims.

What is claimed:

1. A method of making a printed oven mitt, comprising the steps of:
    applying an adhesive resin to a fabric backing layer and a print receiving layer, wherein the adhesive layer is composed of two resin types, a low temperature resin to temporarily secure the respective layers in a working assembly, and a high temperature resin to permanently secure the respective layers upon printing application;
    bonding said print receiving layer to said backing layer using an initial amount of heat and pressure;
    applying a second amount of heat and pressure to said print receiving layer to transfer an image from a transfer dye onto said print receiving layer using a sublimation printing process; and
    attaching perimeters of said print receiving layer and said backing layer to a perimeter of a fabric mitt forming layer to form a pocket between said backing layer and said mitt forming layer, whereby a hand can be inserted into the pocket to use the oven mitt.

2. A method of making a printed oven mitt, comprising the steps of:
    applying an adhesive resin to a fabric backing layer and a print receiving layer;
    bonding said print receiving layer to said backing layer using an initial amount of heat and pressure, wherein the initial amount of heat and pressure is 375–425 degrees F. at 60–80 pounds per square inch;
    applying a second amount of heat and pressure to said print receiving layer to transfer an image from a transfer dye onto said print receiving layer using a sublimation printing process; and
    attaching perimeters of said print receiving layer and said backing layer to a perimeter of a fabric mitt forming layer to form a pocket between said backing layer and said mitt forming layer, whereby a hand can be inserted into the pocket to use the oven mitt.

3. The method of claim 2, wherein said print receiving layer is selected from the group consisting of polyester, nylon, acrylic and combinations thereof.

4. The method of claim 3, wherein said print receiving layer is polyester.

5. The method of claim 2, wherein the adhesive layer is composed of two resin types, a low temperature resin to temporarily secure the respective layers in a working assembly, and a high temperature resin to permanently secure the respective layers upon printing application.

6. The method of claim 5, wherein the composition of resins is between 10% to 40% low temperature resin and 60% to 90% high temperature resin.

7. A printed oven mitt, comprising:
    a fabric backing layer;
    a print receiving layer composed of non-absorbent material selected from the group consisting of polyester, nylon, acrylic and combinations thereof, wherein printing is applied to the print receiving layer using a sublimation printing process;
    an adhesive layer joining the backing and the print receiving layers, wherein the adhesive layer is composed of two resin types, a low temperature resin to temporarily secure the respective layers in a working assembly during an initial heating and pressure of between 375–425 degrees F. and 60–80 pounds per square inch, and a high temperature resin to permanently secure the respective layers upon printing application; and
    a mitt forming layer attached about its perimeter to a perimeter of the backing layer to form a pocket therebetween, whereby a hand can be inserted into the pocket to use the oven mitt.

8. The oven mitt of claim 7, wherein the composition of resins is between 10% to 40% low temperature resin and 60% to 90% high temperature resin.

9. The oven mitt of claim 7, wherein the backing layer is a cotton or a cotton blend.

10. A method of making a printed oven mitt, comprising the steps of:
    applying an adhesive resin to a fabric backing layer and a print receiving layer, the adhesive resin composed of between 10% to 40% low temperature resin to temporarily secure the respective layers in a working assembly, and between 60% to 90% high temperature resin to permanently secure the respective layers upon a second application of heat and pressure;
    bonding said print receiving layer to said backing layer using an initial application of heat and pressure between 375–425 degrees F. and 60–80 pounds per square inch;
    applying the second application of heat and pressure to said print receiving layer to transfer an image from a transfer dye onto said print receiving layer using a sublimation printing process; and
    attaching perimeters of said print receiving layer and said backing layer to a perimeter of a fabric mitt forming layer to form a pocket between said backing layer and said mitt forming layer, whereby a hand can be inserted into the pocket to use the oven mitt.

11. A printed oven mitt, comprising:
    a fabric backing layer;
    a print receiving layer attached to said backing layer, said print receiving layer composed of non-absorbent material selected from the group consisting of polyester, nylon, acrylic and combinations thereof, wherein printing is applied to the print receiving layer using a sublimation printing process;
    an adhesive layer joining the backing and the print receiving layers, wherein the adhesive layer is composed of two resin types, a low temperature resin to temporarily secure the respective layers in a working assembly, and a high temperature resin to permanently secure the respective layers upon printing application; and
    a fabric mitt forming layer; wherein a perimeter of the fabric mitt forming layer is attached to a perimeter of the backing layer to form a pocket therebetween, whereby a hand can be inserted into the pocket to use the oven mitt.

12. The printed oven mitt of claim 11, wherein said print receiving layer is pre-shrunk prior to said printing.

13. The printed oven mitt of claim 11, wherein said print receiving layer is pre-shrunk concurrently said printing.

14. The printed oven mitt of claim 11, wherein said print receiving layer covers less than all of said backing layer.

15. The printed oven mitt of claim 11, wherein said print receiving layer is polyester.

16. The printed oven mitt of claim 11, further comprising an adhesive layer disposed between said print receiving layer and said backing layer.

17. The oven mitt of claim 11, wherein the composition of resins is between 10% to 40% low temperature resin and 60% to 90% high temperature resin.

18. The oven mitt of claim 11, wherein the backing layer is a quilted, heat resistant fabric.

19. The oven mitt of claim 11, wherein the backing layer is a cotton or a cotton blend.

20. The oven mitt of claim 11, wherein the backing layer is 100% cotton.

\* \* \* \* \*